United States Patent
Safari et al.

(10) Patent No.: US 12,206,447 B2
(45) Date of Patent: Jan. 21, 2025

(54) JOINT CHANNEL FILTERING AND CREST FACTOR REDUCTION ARCHITECTURE

(71) Applicant: Altera Corporation, San Jose, CA (US)

(72) Inventors: Nima Safari, London (GB); Richard Maiden, Redwood City, CA (US)

(73) Assignee: Altera Corporation, San Jose, CA (US)

( * ) Notice: Subject to any disclaimer, the term of this patent is extended or adjusted under 35 U.S.C. 154(b) by 467 days.

(21) Appl. No.: 17/355,200

(22) Filed: Jun. 23, 2021

(65) Prior Publication Data

US 2022/0216891 A1 Jul. 7, 2022

Related U.S. Application Data

(60) Provisional application No. 63/134,663, filed on Jan. 7, 2021.

(51) Int. Cl.
*H04B 1/7107* (2011.01)
*H04B 1/00* (2006.01)
*H04B 1/62* (2006.01)

(52) U.S. Cl.
CPC .......... *H04B 1/7107* (2013.01); *H04B 1/0035* (2013.01); *H04B 1/62* (2013.01)

(58) Field of Classification Search
CPC .......... H04B 1/0475; H04B 3/32; H04B 3/23; H04B 3/235; H04B 7/0456; H04B 7/024; H04B 1/525; H04B 7/0697; H04B 7/026; H04B 7/0452; H04B 7/0617; H04B 1/0003; H04B 2001/0408; H04B 2201/70706; H04B 7/0626; H04B 7/18506; H04B 7/0413; H04B 1/04; H04B 1/1027; H04L 27/2614; H04L 27/2624; H04L 1/0054; H04L 25/4917; H04L 2025/03503; H04L 25/067; H04L 25/03057; H04L 2025/0349;

(Continued)

(56) References Cited

U.S. PATENT DOCUMENTS

| | | | |
|---|---|---|---|
| 2021/0184630 A1* | 6/2021 | Varahram | H03F 1/02 |
| 2022/0417071 A1* | 12/2022 | Kwon | H04B 1/0475 |
| 2023/0344695 A1* | 10/2023 | Shih | H04L 27/2624 |

OTHER PUBLICATIONS

Introduction to DSP Builder for Intel FPGAs, Retrieved from https://www.intel.com/content/dam/www/programmable/us/en/pdfs/literature/hb/dspb/hb_dspb_intro.pdf, Oct. 20, 2019, 10 pages, intel.

(Continued)

*Primary Examiner* — Golam Sorowar
(74) *Attorney, Agent, or Firm* — Viering, Jentschura & Partner mbB (57) ABSTRACT

A signal processing device includes a filter, configured to receive first data representing a signal for wireless transmission, modify the first data in a filter operation, and output second data as the modified first data; a peak detector, configured to detect third data representing a peak of the signal, wherein the third data are a subset of the first data; a signal canceller, configured to receive the third data and to generate fourth data representing a cancellation signal corresponding to the peak of the signal; and a peak modifier, configured to receive the second data and the fourth data, and to generate fifth data using the second data and the fourth data, wherein the fifth data represent the signal with a modified peak.

10 Claims, 9 Drawing Sheets

(58) Field of Classification Search
CPC ........... H04L 2025/03617; H04L 25/14; H04L 25/03038; H04L 1/242; H04L 2025/03363; H04L 2025/03496; H04L 2025/03477; H03F 3/24; H03F 1/3241; H03F 2201/3224; H03F 1/3247; H03F 1/0205; H03F 1/3258; H03F 2200/165; H03F 2201/3209; H03F 2201/3212; H03F 2200/258; H03F 2200/336; H03F 2201/3233; H03F 3/189; H03F 3/68; H03F 2200/451; H03F 1/0288; H03F 2200/405; H03F 3/19
See application file for complete search history.

(56) References Cited

OTHER PUBLICATIONS

5G; NR; Base Station (BS) radio transmission and reception, Oct. 2018, 160pages, 3GPP TS 38.104, version 15.3.0 Release 15, ETSI.
O-RAN.WG4.CUS.0-v03.00, Technical Specification, 2020, 253 pages, O-RAN Fronthaul Working Group, Control, User and Synchronization Plane Specification, O-RAN Alliance.
O-RAN.WG4.CUS.0-v06.00, Technical Specification, 2021, 298 pages, O-RAN Fronthaul Working Group, Control, User and Synchronization Plane Specification, O-RAN Alliance.

* cited by examiner

JOINT CHANNEL FILTERING AND CREST FACTOR REDUCTION ARCHITECTURE

CROSS-REFERENCE TO RELATED APPLICATIONS

This application claims priority to U.S. Provisional Application 63/134,663, filed on Jan. 7, 2021, the entirety of which is incorporated herein by reference.

TECHNICAL FIELD

Aspects of this disclosure relate to crest-factor reduction for radiofrequency communication.

BACKGROUND

Various wireless communication protocols, including but not limited to, The Fifth Generation Technology for Broadband Cellular Networks (5G), include strict requirements on round trip latency for Ultra-Reliable Low Latency Communications (URLLC) and Mobile Broadband Band (MBB) applications. To meet these standards, for improved efficiency, and/or as desired for a given implementation, it may be desired to reduce latency in radiofrequency communications.

BRIEF DESCRIPTION OF THE DRAWINGS

In the drawings, like reference characters generally refer to the same parts throughout the different views. The drawings are not necessarily to scale, emphasis instead generally being placed upon illustrating the exemplary principles of the disclosure. In the following description, various exemplary aspects of the disclosure are described with reference to the following drawings, in which.

DESCRIPTION

The following detailed description refers to the accompanying drawings that show, by way of illustration, specific details and aspects in which the Disclosure may be practiced.

The word "exemplary" is used herein to mean "serving as an example, instance, or illustration." Any aspect of the disclosure or design described herein as "exemplary" is not necessarily to be construed as preferred or advantageous over other aspects or designs.

The words "plural" and "multiple" in the description and the claims expressly refer to a quantity greater than one. Accordingly, any phrases explicitly invoking the aforementioned words (e.g. "a plurality of [objects]", "multiple [objects]") referring to a quantity of objects expressly refers more than one of the said objects. The terms "group (of)", "set [of]", "collection (of)", "series (of)", "sequence (of)", "grouping (of)", etc., and the like in the description and in the claims, if any, refer to a quantity equal to or greater than one, i.e. one or more. The terms "proper subset", "reduced subset", and "lesser subset" refer to a subset of a set that is not equal to the set, i.e. a subset of a set that contains less elements than the set.

It is appreciated that any vector and/or matrix notation utilized herein is exemplary in nature and is employed solely for purposes of explanation. Accordingly, it is understood that the approaches detailed in this disclosure are not limited to being implemented solely using vectors and/or matrices, and that the associated processes and computations may be equivalently performed with respect to sets, sequences, groups, etc., of data, observations, information, signals, etc. Furthermore, it is appreciated that references to a "vector" may refer to a vector of any size or orientation, e.g. including a 1×1 vector (e.g. a scalar), a 1×M vector (e.g. a row vector), and an M×1 vector (e.g. a column vector). Similarly, it is appreciated that references to a "matrix" may refer to matrix of any size or orientation, e.g. including a 1×1 matrix (e.g. a scalar), a 1×M matrix (e.g. a row vector), and an M×1 matrix (e.g. a column vector).

A "circuit" as user herein is understood as any kind of logic-implementing entity, which may include special-purpose hardware or a processor executing software. A circuit may thus be an analog circuit, digital circuit, mixed-signal circuit, logic circuit, processor, microprocessor, Central Processing Unit ("CPU"), Graphics Processing Unit ("GPU"), Digital Signal Processor ("DSP"), Field Programmable Gate Array ("FPGA"), integrated circuit, Application Specific Integrated Circuit ("ASIC"), etc., or any combination thereof. Any other kind of implementation of the respective functions which will be described below in further detail may also be understood as a "circuit." It is understood that any two (or more) of the circuits detailed herein may be realized as a single circuit with substantially equivalent functionality, and conversely that any single circuit detailed herein may be realized as two (or more) separate circuits with substantially equivalent functionality. Additionally, references to a "circuit" may refer to two or more circuits that collectively form a single circuit.

As used herein, "memory" may be understood as a non-transitory computer-readable medium in which data or information can be stored for retrieval. References to "memory" included herein may thus be understood as referring to volatile or non-volatile memory, including random access memory ("RAM"), read-only memory ("ROM"), flash memory, solid-state storage, magnetic tape, hard disk drive, optical drive, etc., or any combination thereof. Furthermore, it is appreciated that registers, shift registers, processor registers, data buffers, etc., are also embraced herein by the term memory. It is appreciated that a single component referred to as "memory" or "a memory" may be composed of more than one different type of memory, and thus may refer to a collective component including one or more types of memory. It is readily understood that any single memory component may be separated into multiple collectively equivalent memory components, and vice versa. Furthermore, while memory may be depicted as separate from one or more other components (such as in the drawings), it is understood that memory may be integrated within another component, such as on a common integrated chip.

The term "base station" (BS) used in reference to an access point of a mobile communication network may be understood as a macro base station, micro base station, Node B, evolved NodeB ("eNB"), Home eNodeB, Remote Radio Head ("RRH"), relay point, etc., and may include base stations implemented with conventional base station architectures (e.g. distributed, "all-in-one", etc.) and base stations implemented with centralized base stations architectures (e.g. Cloud Radio Access Network ("Cloud-RAN") or Virtual RAN ("Vran")). As used herein, a "cell" in the context of telecommunications may be understood as a sector served by a base station. Accordingly, a cell may be a set of geographically co-located antennas that correspond to a particular sectorization of a base station. A base station may thus serve one or more cells (or sectors), where each cell is characterized by a distinct communication channel. Furthermore, the term "cell" may be utilized to refer to any of a macrocell, microcell, femtocell, picocell, etc.

For purposes of this disclosure, radio communication technologies may be classified as one of a Short Range radio communication technology, Metropolitan Area System radio communication technology, or Cellular Wide Area radio communication technology. Short Range radio communication technologies include Bluetooth, WLAN (e.g. according to any IEEE 802.11 standard), and other similar radio communication technologies. Metropolitan Area System radio communication technologies include Worldwide Interoperability for Microwave Access ("WiMax") (e.g. according to an IEEE 802.16 radio communication standard, e.g. WiMax fixed or WiMax mobile) and other similar radio communication technologies. Cellular Wide Area radio communication technologies include GSM, UMTS, LTE, LTE-Advanced ("LTE-A"), CDMA, WCDMA, LTE-A, General Packet Radio Service ("GPRS"), Enhanced Data Rates for GSM Evolution ("EDGE"), High Speed Packet Access ("HSPA"), HSPA Plus ("HSPA+"), and other similar radio communication technologies. Cellular Wide Area radio communication technologies also include "small cells" of such technologies, such as microcells, femtocells, and picocells. Cellular Wide Area radio communication technologies may be generally referred to herein as "cellular" communication technologies. It is understood that exemplary scenarios detailed herein are demonstrative in nature, and accordingly may be similarly applied to various other mobile communication technologies, both existing and not yet formulated, particularly in cases where such mobile communication technologies share similar features as disclosed regarding the following examples.

The term "network" as utilized herein, e.g. in reference to a communication network such as a mobile communication network, encompasses both an access section of a network (e.g. a radio access network ("RAN") section) and a core section of a network (e.g. a core network section). The term "radio idle mode" or "radio idle state" used herein in reference to a mobile terminal refers to a radio control state in which the mobile terminal is not allocated at least one dedicated communication channel of a mobile communication network. The term "radio connected mode" or "radio connected state" used in reference to a mobile terminal refers to a radio control state in which the mobile terminal is allocated at least one dedicated uplink communication channel of a mobile communication network.

Unless explicitly specified, the term "transmit" encompasses both direct (point-to-point) and indirect transmission (via one or more intermediary points). Similarly, the term "receive" encompasses both direct and indirect reception. The term "communicate" encompasses one or both of transmitting and receiving, i.e. unidirectional or bidirectional communication in one or both of the incoming and outgoing directions.

Employing sophisticated modulations such as Orthogonal Frequency Division Multiplexing (OFDM), devices may perform wireless communication with higher spectral efficiency. This increased efficiency resulting from the use of OFDM, however, comes at the expense of non-constant envelope signal with high Peak to Average Power Ratio (PAPR). High PAPR places demands on data converters and adversely affects the efficiency of power amplifiers (PAs) used in wireless base stations. Reducing the PAPR increases PA efficiency, thereby allowing higher average power to be transmitted before saturation occurs.

Crest factor reduction (CFR) is a digital technique used to limit the dynamic range of the signals transmitted in wireless or other communications systems. In a modern transmit chain, radiofrequency communication device will often incorporate CFR with digital predistortion (DPD), which acts to linearize the PA, allowing operation at maximum efficiency with spectral compliance. CFR is helpful to DPD because it reduces the dynamic range of the signal, thereby easing linearization.

Figure 1:
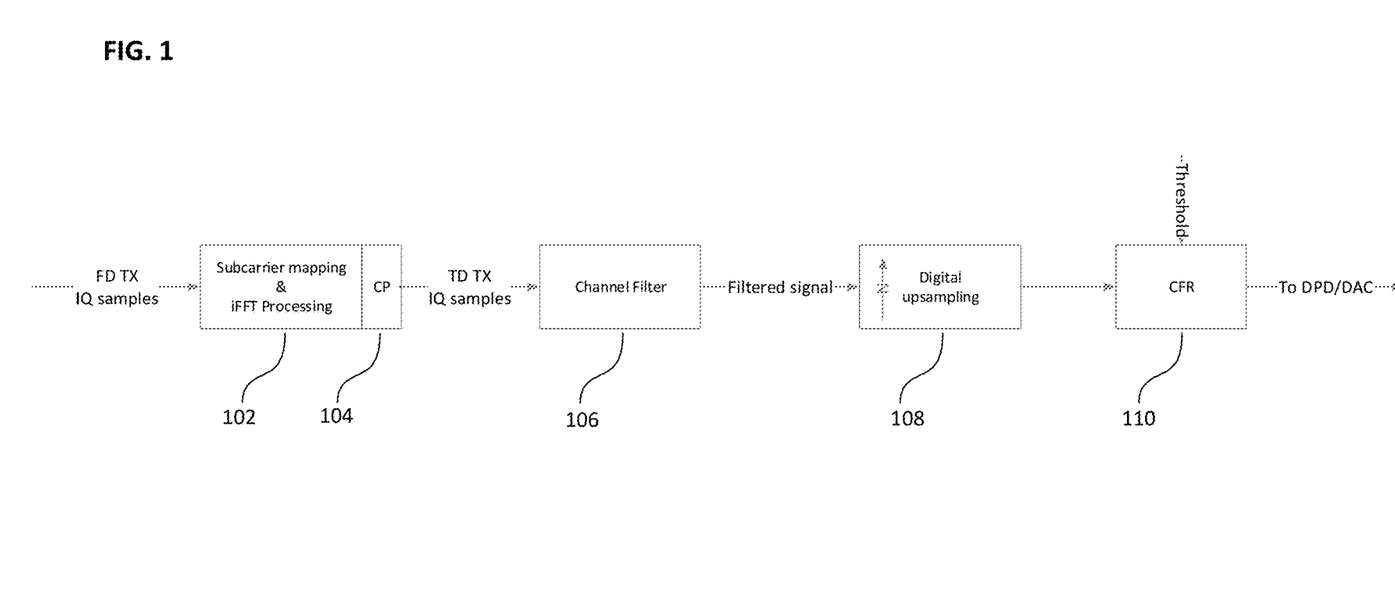
FIG. 1 depicts a block diagram of a conventional downlink Radio Unite (RU) processing in a 5G system.

FIG. 1 shows a block diagram of a conventional downlink Radio Unite (RU) processing in a 5G system. In this figure, a radiofrequency communication device receives IQ samples in the Frequency Domain (FD) and maps the IQ samples on orthogonal subcarriers 102 through inverse Fast Fourier Transform (iFFT) processing to form an OFDM symbol in the Time Domain (TD). The radiofrequency communication device adds a cyclic prefix (CP) 104 at the beginning of the symbol to improve the resistance against a multipath fading communication channel. The radiofrequency communication device passes the TD-OFDM symbol through a channel filter 106 to ensure the transmit band meets the spectral mask requirements.

The radiofrequency communication device then upsamples 108 (e.g. via an upsampler) the output of the channel filter (e.g. the filtered signal). This upsampling may increase the PAPR. Because the upsampling may be associated with an increase in the PAPR, the upsampler is typically configured to output the upsampled signal to a crest factor reducer 110 (e.g. the crest factor reducer is normally situated after the digital upsampling stage). The crest factor reducer 110 may be configured to output a reduced crest factor signal. A digital predistorter and/or a digital/analog converter may receive this outputted signal for further processing.

As stated above, this upsampling operation may conventionally be associated with an increase in the PAPR, which may therefore necessitate a subsequent CFR operation. At least due to this factor, it is known to perform channel filtering, upsampling, and CFR in a series or linear fashion (e.g. one after the other). However, for wideband 5G waveforms, the upsampling factor, N, is typically small, and hence the increase in PAPR is either insignificant or can be pre-compensated in CFR threshold settings. Therefore, a radiofrequency communication device can perform CFR directly after channel filtering. Otherwise stated, at least when using wideband 5G waveforms, a radiofrequency communication device may perform the CFR operation prior to digital upsampling. As will be described, the one may utilize this ability to perform the CRF operation prior to digital upsampling to design a digital signal processor that utilizes fewer steps and/or exhibits increased efficiency.

In light of the foregoing, various architectures for joint processing of the channel filtering and CFR module are proposed herein. These architectures may allow for, inter alia, significant reduction in pipelining latency and algorithmic latency.

In 4G architecture, for example, a radiofrequency communication device conventionally performs CFR in accordance with FIG. 1, and hence two entirely separate modules are implemented to meet the spectral mask and signal Peak reduction. Even if they are combined such as in double clipping, they are combined sequentially, resulting in no savings in latency.

Figure 2:
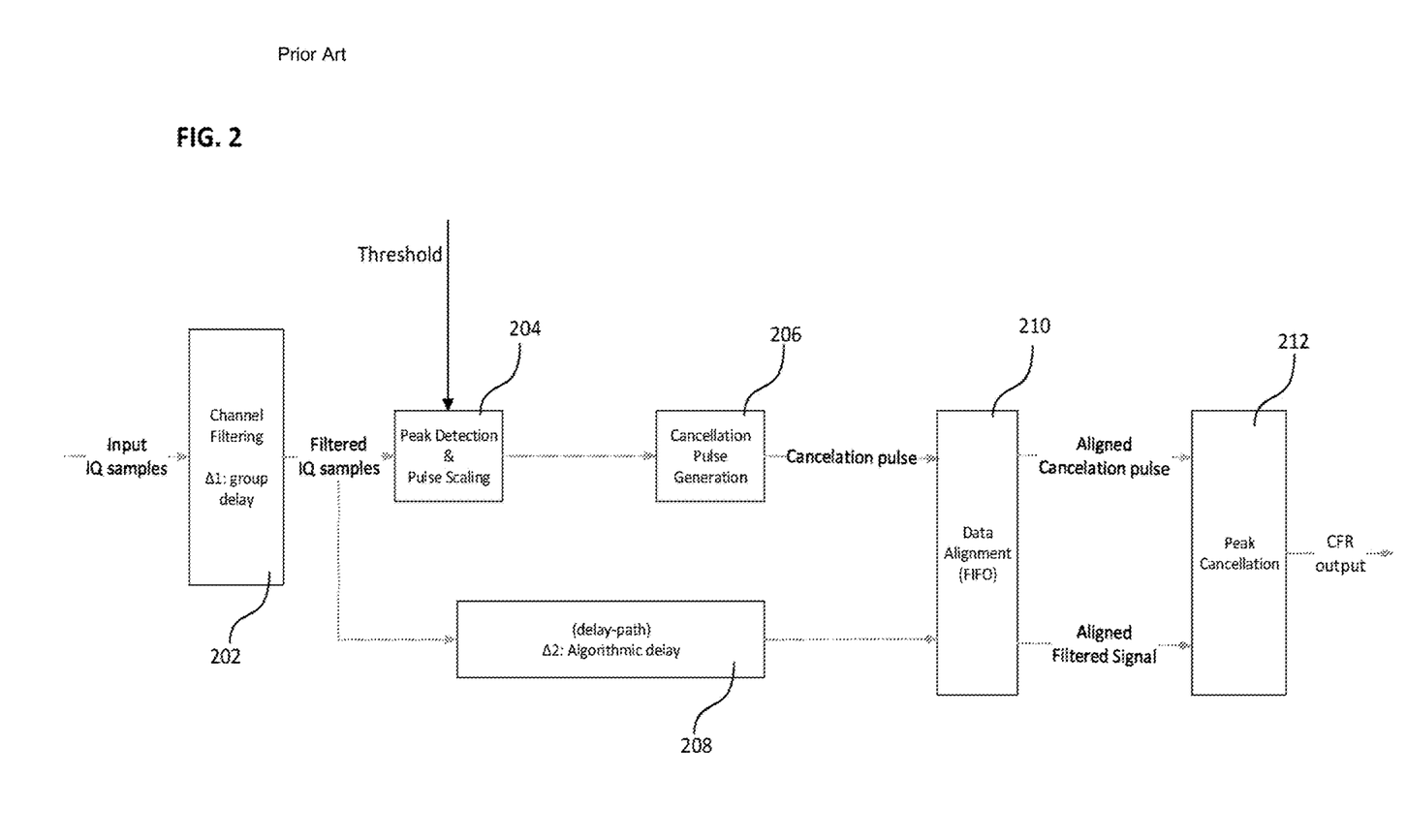
FIG. 2 depicts a conventional architecture for radio processing.

FIG. 2 shows a conventional separate-architecture for channel filtering and CFR. In this figure, a channel filter 202 receives input IQ samples, performs a filtering operation on the IQ samples, and outputs filtered IQ samples. A Finite Impulse Response (FIR) delay-tap structure may be used for channel filtering, according to the system requirements.

The channel filter 202 outputs the filtered IQ samples along two paths. From the first path, a peak detection and pulse scaling module 204 receives the filtered IQ samples and detects a peak of the corresponding signal. The peak detection and pulse scaling module 204 may be configured to compare a magnitude of the filtered IQ samples against a threshold to detect peaks.

The peak detection and pulse scaling module 204 outputs the detected peak information to a cancellation pulse generation module 206. Based on the detected peaks, the cancellation pulse generation module 206 generates one or more cancellation pulses, which are outputted to a data alignment module 210. The cancellation pulse generation module 206 may generate the cancellation pulse based on the detected peak. The cancellation pulse generation module 206 may generate the cancellation pulse using any of a variety of techniques. According to one aspect of the disclosure, The cancellation pulse generation module 206 may generate Sinc pulses for one or more FIR structures or the Sinc pulses can be stored in memory and used for the cancellation pulse generation. In other CFR techniques, the cancellation pulse generation module 206 may use a windowed signal for the cancellation pulse generation.

In parallel, and along the second path, the channel filter 202 outputs the filtered IQ samples to an algorithmic delay module 208. The algorithmic delay module 208 institutes a delay, at the end of which the algorithmic delay module 208 outputs the filtered IQ samples to the data alignment module 210. The data alignment module 210 receives both the cancellation pulse and the delayed filtered IQ samples, aligns them, and outputs and aligned cancellation pulse and the aligned filter signal to a peak cancellation module/peak canceller 212, which performs a cancellation operation on the filtered signal using the cancellation pulse. According to an aspect of the disclosure, the peak canceller may perform the cancellation operation by subtracting the cancellation pulse from the filtered signal. Subtracting the cancellation pulse from the signal may result in a reduction of the PAPR.

The path delay 208 may serve to mimic the algorithmic latency of the Peak detection and cancellation pulse generation. According to an aspect of the disclosure, a small FIFO may compensate the variations in pipelining delay (e.g. such as due to system clock and targeted device).

In the conventional architecture depicted in FIG. 2, the overall latency includes the combined latency of the channel filter and CFR modules as follows:

$$\Delta_{seperate} = \Delta_1 + \Delta_2 \tag{1}$$

That is, because the channel filtering and CFR are performed in series (e.g. one after the other), the latency of each operation is added to generate the overall latency.

In the following, a new architecture to run peak reduction and channel filtering in a parallel structure is disclosed. This parallel structure permits decreased latency compared to the conventional structure, in which channel filtering and CFR are performed in series.

More specifically, and in the principles and methods disclosed herein, the signal processing device may employ the channel filter (which may require a significant number of clock cycles) concurrently inside the CFR module to implement the path delay. In this architecture, the latency of the combined channel filter and CFR block are reduced to:

$$\Delta_{combined} = \max(\Delta_1, \Delta_2) \tag{2}$$

In other words, the signal processing device may implement the path delay inside the CFR may through FIR processing, which therefore results in reduced resource usage (e.g. in RAM blocks) and reduced overall latency.

Figure 3:
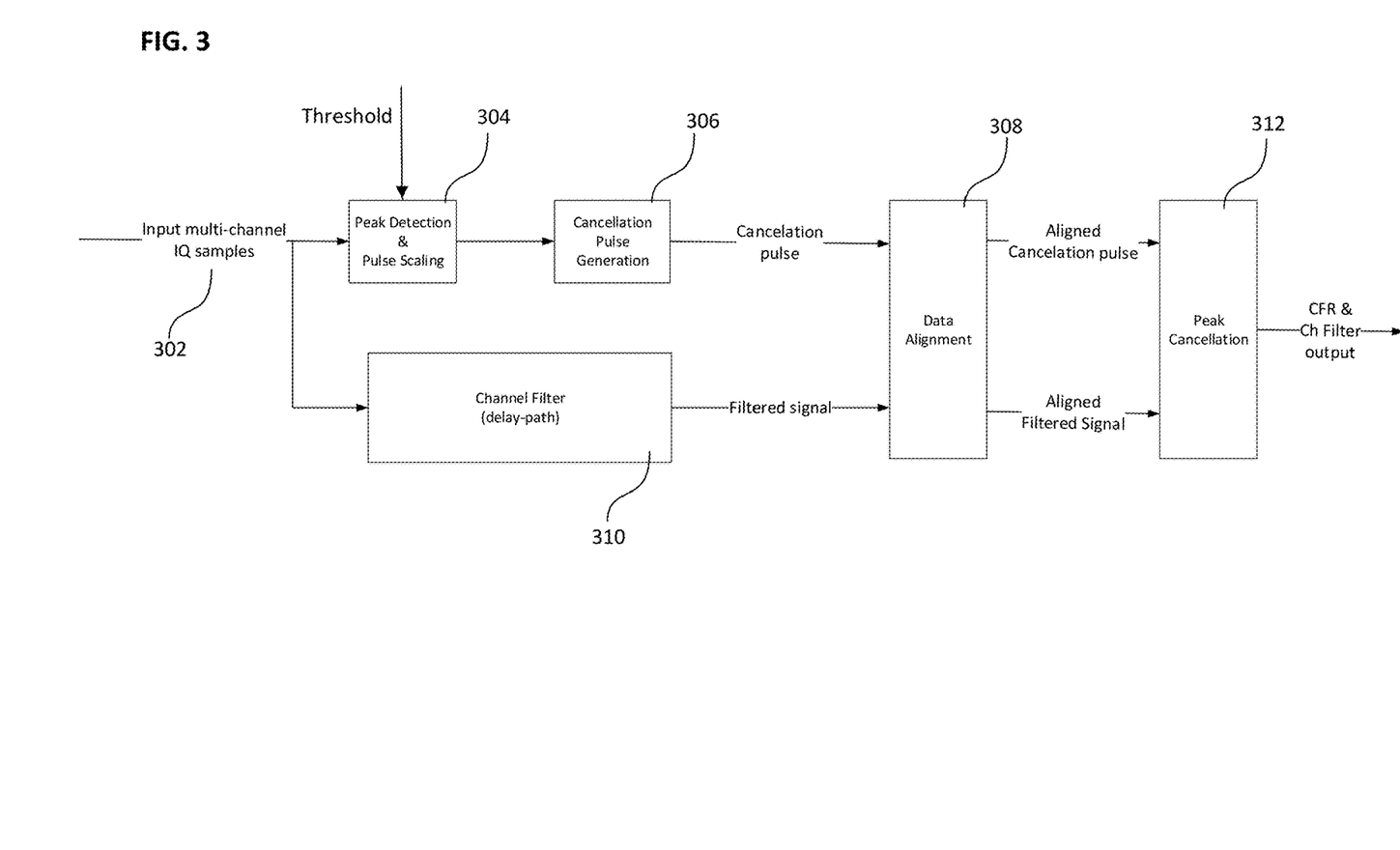
FIG. 3 depicts an architecture in which channel filtering and CFR are combined and thus result in reduced overall latency.

FIG. 3 depicts an architecture in which channel filtering and CFR are combined and thus result in reduced overall latency. In this figure, the channel filter is moved inside the CFR where the path delay is implemented. Input multichannel IQ samples 302 are sent along two paths that operate in parallel. Along the first path, a peak detection and pulse scaling module (also referred to herein as a peak detector) 304 receives the input multichannel IQ samples 302. The peak detection and pulse scaling module 304 may be configured to detect one or more peaks within the signal represented by the input multichannel IQ samples 302. The peak detection and pulse scaling module 304 may output data representing the detected peaks to the cancellation pulse generator 306 (also referred to herein as a signal canceller). The cancellation pulse generator 306 may be configured to receive the data representing the detected peaks from the peak detection and pulse scaling module 304 and to generate one or more cancellation pulses based on the received data representing the detected peaks. The cancellation pulse generation module 306 may be further configured to output these one or more cancellation pulses to a data alignment module 308.

Along the second path, occurring in parallel with the first path, the channel filter 310 may receive the input multichannel IQ samples 302. The channel filter 310 may perform one or more filtering operations on the input multichannel IQ samples 302 and may output a filtered signal representing the filtered multichannel IQ samples to the data alignment module 308. The data alignment module 308 may optionally be configured as a FIFO. The data alignment module 308 may be configured to receive the cancellation pulse and the filtered signal; to align the cancellation pulse and filtered signal; and to output the aligned cancellation pulse and the aligned filtered signal to the peak cancellation module 312. The peak cancellation module 312 may be configured to receive the aligned cancellation pulse in the aligned filtered signal and to perform one or more peak cancellation operations on the aligned filtered signal using the aligned cancellation pulse. According to an aspect of the disclosure, the peak cancellation module 312 may be configured to perform a peak cancellation operation by subtracting the cancellation pulse from the filtered signal.

Unlike the architecture of FIG. 2, the architecture of FIG. 3 depicts a parallel filtering and cancellation pulse generation operation, in which the cancellation pulse is generated using the unfiltered signal. The original signal is then filtered before peak cancellation. Even though channel filtering may influence the size of peak somewhat, it is been determined that for the principles and methods described herein, this change may be insignificant and/or sufficiently small that it does not unduly negatively affect the performance of the CFR.

In this architecture, the latency of the combined channel filter and CFR block are reduced to:

$$\Delta_{combined} = \max(\Delta_1, \Delta_2) \qquad (3)$$

Moreover, the signal processing device may implement the path delay as depicted herein through FIR processing, which may result in reduced resource usages in particular RAM blocks.

In many use cases, a FIR structure may generate the CFR cancellation pulse. In such applications, the FIR structure may be shared between the channel filter and CFR pulse generation, resulting in further resource optimizations in addition to the latency savings in combined architecture disclosed herein. For these purposes, and according to an aspect of the disclosure, the clock rate used in the FIR operation may be higher than the input sampling rate.

Figure 4:
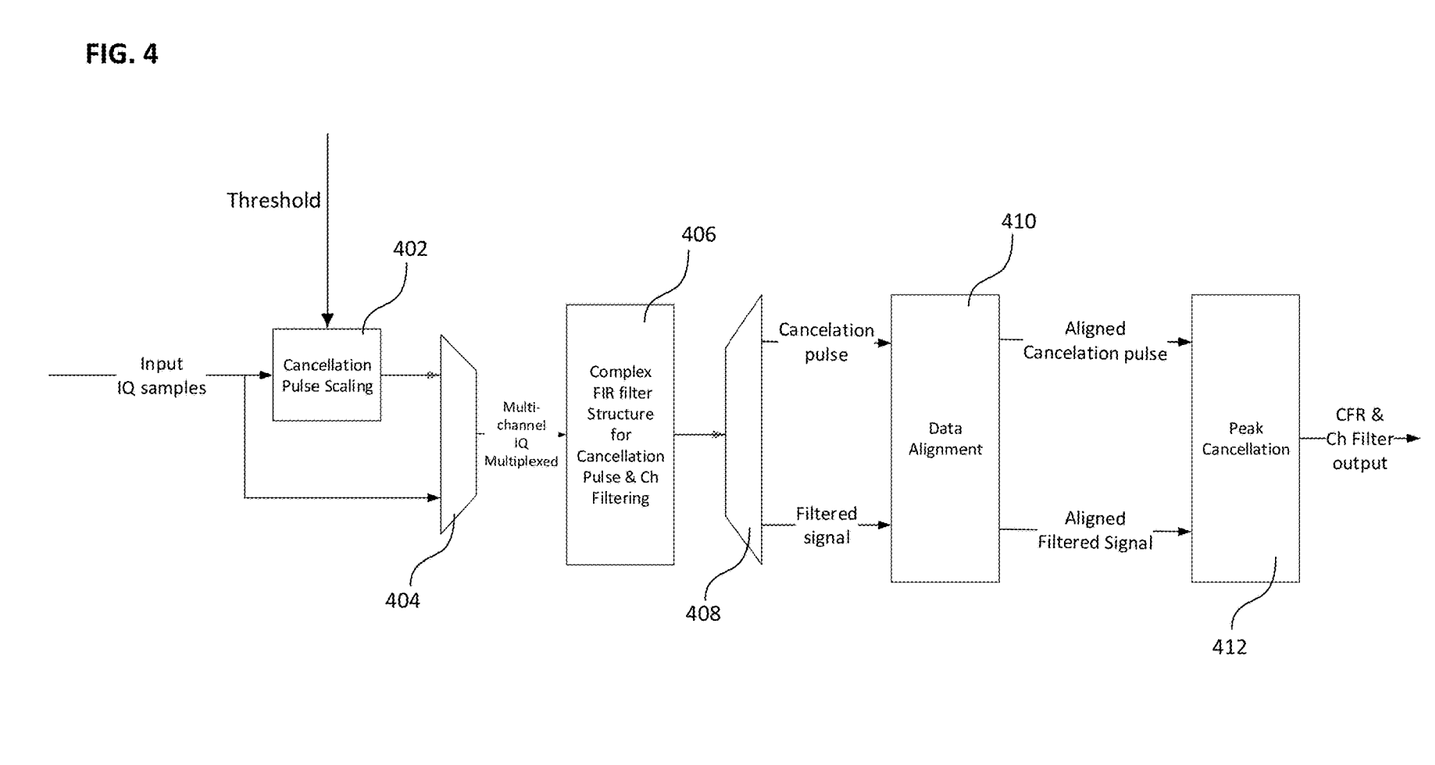
FIG. 4 depicts a proposed architecture for combined CFR and channel filtering with shared resources according to another aspect of the disclosure.

FIG. 4 depicts a proposed architecture for combined CFR and channel filtering, with shared resources, according to another aspect of the disclosure. In this figure, input IQ samples are sent along two parallel paths. On the first path, the input IQ samples are processed within the cancellation pulse scaling module 402, the output of which is multiplexed 404 with the input IQ samples to output a signal of multiplexed multichannel IQ samples. That is, the input IQ samples and the detected peaks are time division multiplexed. The cancellation pulse scaling module may be configured to detect one or more peaks in the IQ samples. The cancellation pulse scaling module made be referred to here as a peak detector.

These time-multiplexed multichannel IQ samples are received by the complex FIR filter structure for cancellation pulse and channel filtering 406. This complex FIR filter structure may be referred to herein as a signal processor, such as, but not limited to, a signal processor that is configured to receive the first data and the second data, modify the first data in a filter operation, and output third data as the modified first data; and further configured to receive the second data and to generate fourth data representing a cancellation signal corresponding to the peak of the signal. The complex FIR filter structure for cancellation pulse and channel filtering 406 may both generate one or more cancellation pulses and perform channel filtering on the receive signal.

The output of the complex FIR filter structure for cancellation pulse and channel filtering 406 may then be sent to a demultiplexer, which may output the cancellation pulse and filtered signal for further data alignment. The data alignment module 410 may be configured to receive the cancellation pulse and the filtered signal from the demultiplexer 408 and to align the cancellation pulse and the filtered signal. The data alignment module 410 may be configured to output the aligned cancellation pulse and the aligned filtered signal to a peak cancellation module 412 (also referred to herein as a peak modifier). The peak cancellation module 412 may be configured to cancel or modify a peak of the filtered signal using the cancellation pulse, such as described herein. The peak cancellation module 412 may be configured to output a filtered signal whose one or more peaks have been canceled or modified according to a CFR procedure.

Figure 5:
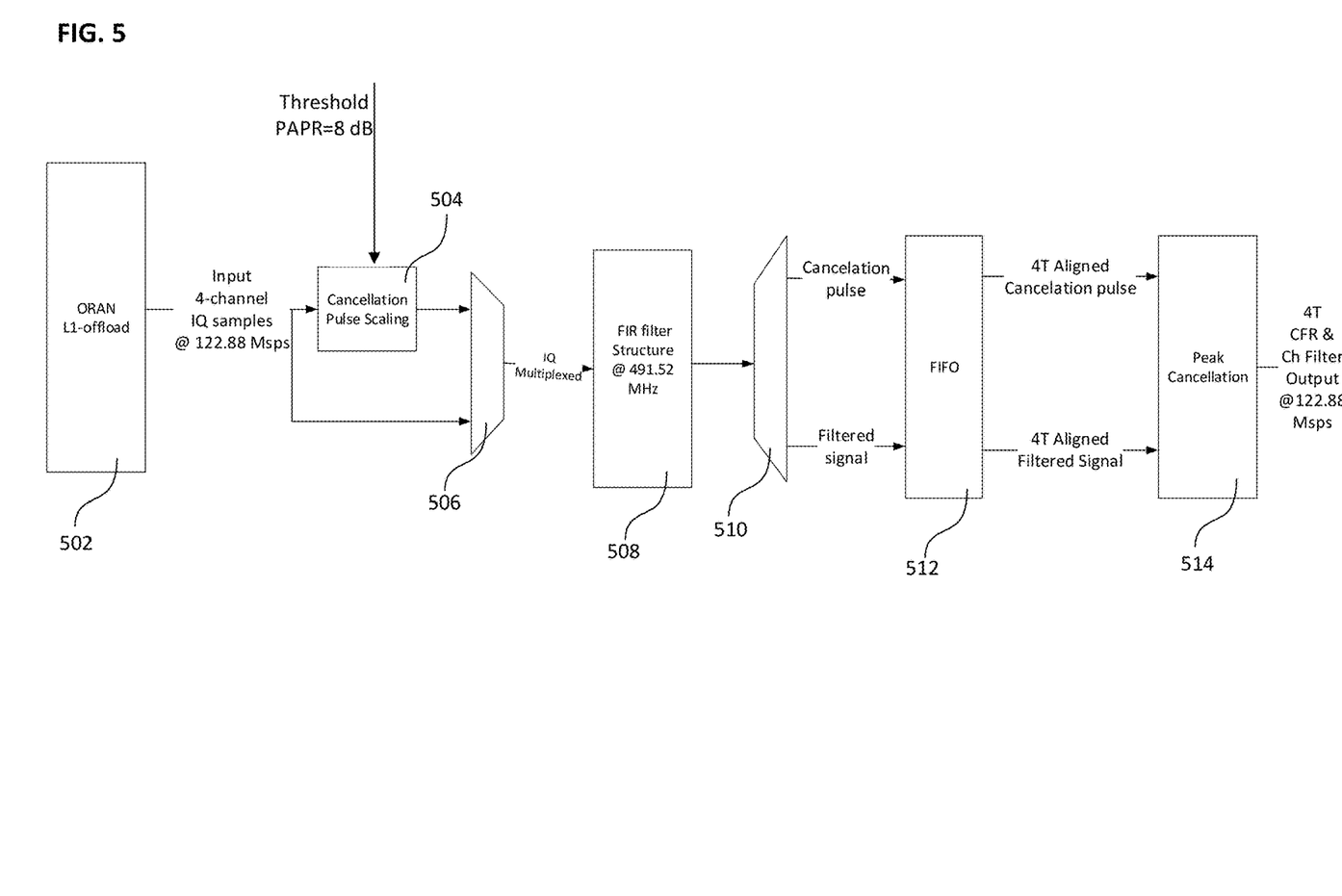
FIG. 5 depicts a combined filter and cancellation pulse architecture in a 5G O-RU architecture, according to another aspect of the disclosure.

FIG. 5 depicts a combined filter and cancellation pulse architecture in a 5G O-RU architecture, according to another aspect of the disclosure. In this example, the IQ samples (e.g. frequency domain samples) may be received through an Open RAN (Open Radio Access Network) (O-RAN) interface 502 and proceed through Layer 1 processing including an Inverse Fast Fourier Transformation (iFFT) and addition of a cyclic prefix. A multiplexer may multiplex time division samples for multiple antennas (e.g. for 2 antennas, for four antennas, for more than four antennas) 506, such as, for example, at a sampling rate of 122.88 Msps. This waveform may then be fed into the multi-channel proposed architecture.

In greater detail, a multiplexer may output the multiplexed samples to a filter 508, which, according to an aspect of the disclosure, may be configured as a FIR filter structure. According to one aspect of the disclosure, the FIR filter structure may be configured to operate at approximately 491.52 MHz. The filter 508 may be configured to perform one or more filtering operations on the IQ samples and to generate one or more cancellation pulses for cancellation or reduction of a detected peak. A demultiplexer 510 may demultiplex the output of the filter 508 into a cancellation pulse in a filtered signal. A FIFO 512 may receive the cancellation pulse and filtered signal and may align the cancellation pulse and filtered signal to output an aligned cancellation pulse and an aligned filtered signal. The peak canceller 514 may be configured to receive the aligned cancellation pulse and the aligned filtered signal, and to perform one or more peak cancellation operations (e.g. subtracting the cancellation pulse from the filtered signal) to output a channel filter output having a reduced or canceled peak (e.g. using a CFR operation). According to an aspect of the disclosure, the peak cancelator 514 output may be a 4T CFR & Channel Filter Output. According to another aspect of the disclosure, the peak canceller output may be an output at 122.88 Msps. In one exemplary implementation, the threshold level for the PAPR limit was set at 8 dB. As shown in FIG. 5, two instantiations of the FIR filter were used to process 4 antennas of IQ samples when running the design at a 491.52 MHz clock rate.

Figure 6:
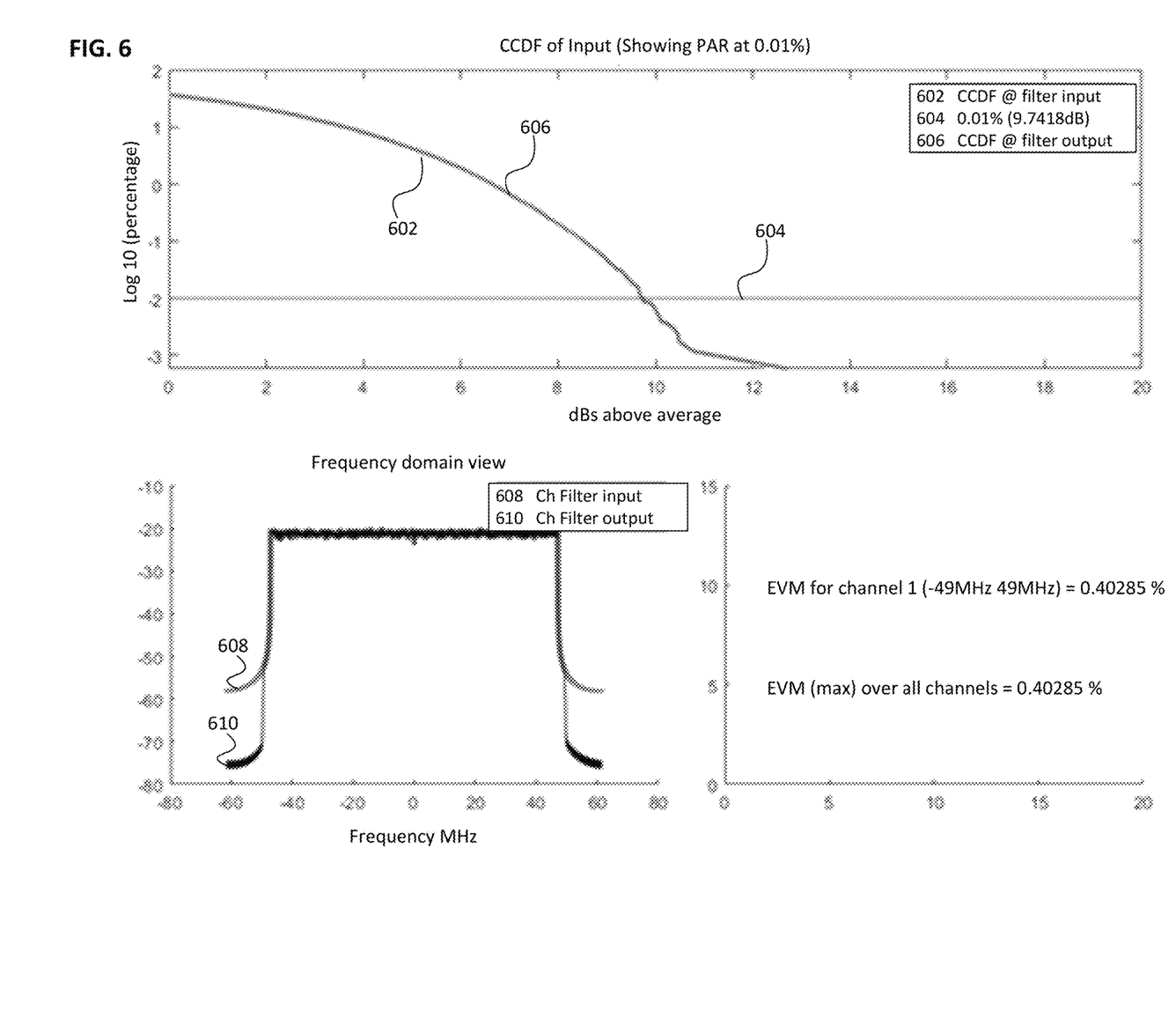
FIG. 6 depicts Complementary Cumulative Distribution Function (CCDF), spectrum and EVM measurements at the channel filter output, according to an aspect of the disclosure.

FIG. 6 depicts the Complementary Cumulative Distribution Function (CCDF) spectrum and EVM measurements at the channel filter output, according to an aspect of the disclosure. That is, the output of the channel filter is observed as compared to the unfiltered data. FIG. 6 indicates the CCDF at filter input as 602, the 0.01% (9.7418 dB) as 604, and the CCDF at filter output as 606. Turning to the frequency domain, FIG. 6 shows the channel filter input as 608 and the channel filter output as 610. As shown in FIG. 6, it is very unlikely to receive peaks above the average power at the input and output of the channel filter. In fact, channel filtering may only smooth the input modulated waveform, such as by lowering the stop-band rejection level. This change may, however, be well below the signal level, and therefore the effect on the signal PAPR may be insignificant. As shown in the output spectrum, the out-of-band signal level may be dropped according to the channel filter specifications. The in-band quality of the output signal is also shown in EVM measurement below.

Figure 7:
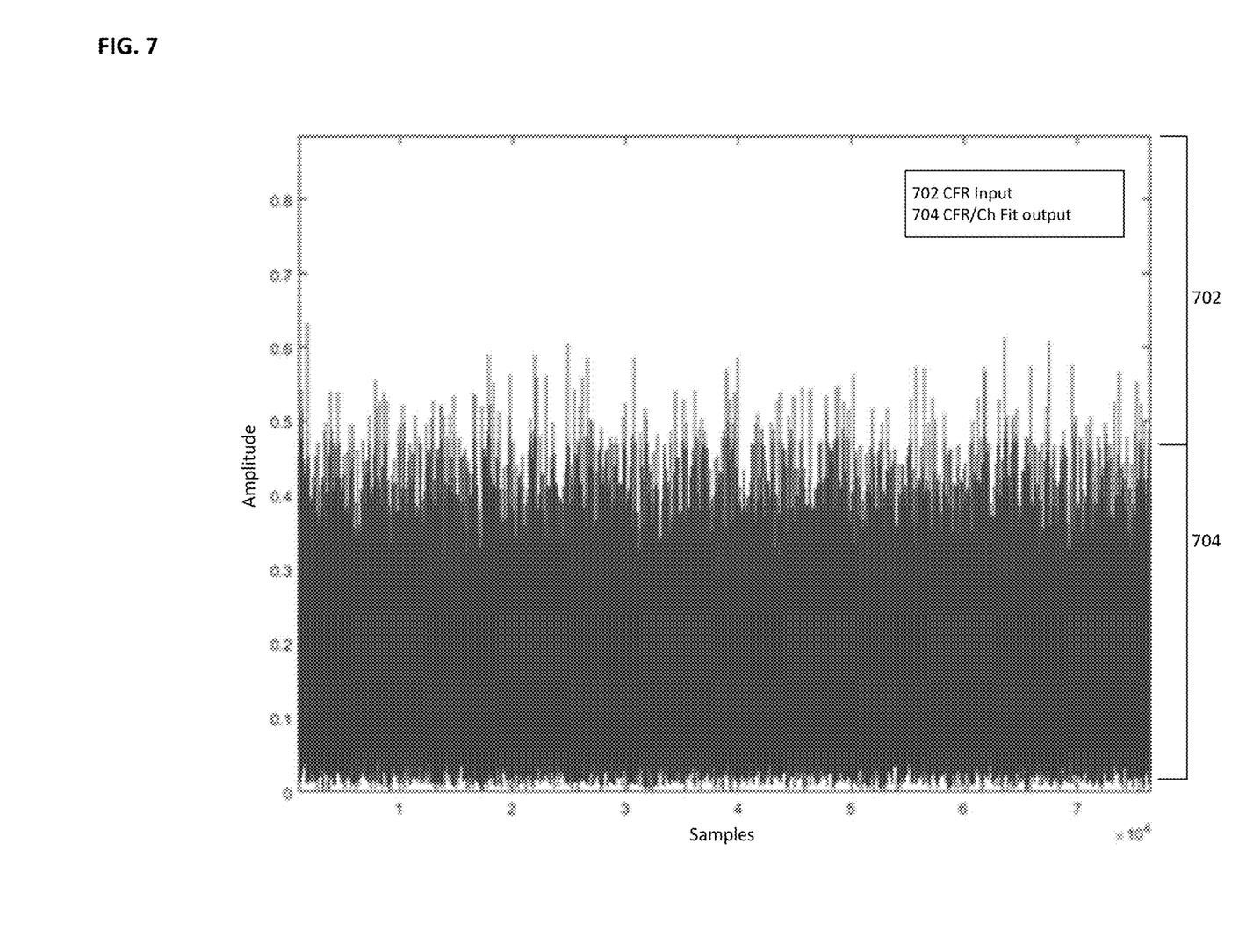
FIG. 7 depicts the results of the Finite Impulse Response structure being implemented in the CFR design architecture of FIG. 5.

FIG. 7 depicts the results of the FIR structure being implemented in the CFR design architecture of FIG. 5. The unfiltered TD samples for 4 antennas as described above are used as the input test vector. FIG. 7 shows the Amplitude of the signals at the input and output of the combined channel filtering and CFR architecture. The threshold is represented as the intersection of 702 and 704. As the figure shows, the input peaks above the threshold (e.g. the peaks within the range corresponding to 702) are detected and cancelled at the output, such that only signal within the range of 704 remains.

Figure 8:
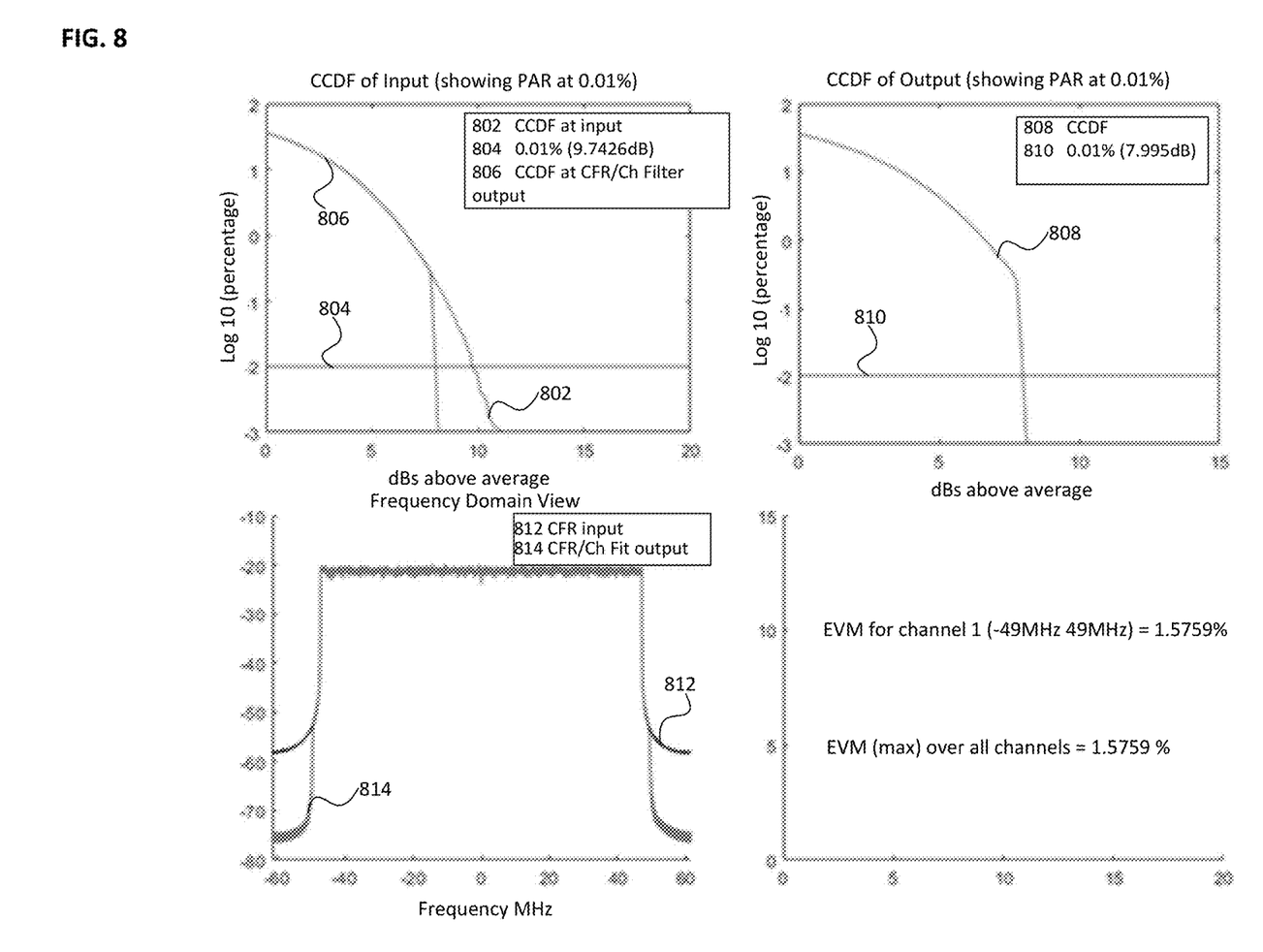
FIG. 8 depicts the signal quality measured at the input and output of the combined channel filtering and CFR architecture.

FIG. 8 depicts the signal quality measured at the input and output of the combined channel filtering and CFR architecture. At the top left ("CCDF of Input (showing PAR at 0.01%)), the CCDF at input is shown as 802, the 0.01% (9.7426 dB) is shown as 804, and the CCDF at CFR/Ch Filter Output is shown as 806. At the top right ("CCDF of Output (showing PAR at 0.01%)), the CCDF is shown as 808 and the 0.01% (7.995 dB) is shown as 810. At the bottom left ("dBs above average. Frequency Domain View"), the CFR input is shown as 812, and the CFR/Ch Fit Ouput is shown as 814. As shown in FIG. 8, the peaks are detected and cancelled at the desired level of 8 dB PAPR at the output of the module. The signal spectrum at the output shows stop-band rejection according to the filter design specifications. Finally, the EVM measurement shows the signal constellation quality after an 8 dB PAPR limitation, which is well below the 5G NR requirements.

The latencies of the channel filtering as described herein with a FIR-based CFR were measured as follows:

$$\Delta_1 = 1.40\ \mu s \quad (4)$$

$$\Delta_2 = 1.55\ \mu s \quad (5)$$

Hence the two cascaded modules will result in a latency of $\Delta_{seperate} = \Delta_1 + \Delta_2 = 2.95\ \mu s$. In contrast, the latency of the combined proposed architecture is $= 1.55\ \mu s$. Otherwise stated, the signal processing device according to this disclosure may reduce latency by nearly half, compared to that of the conventional, separate processing.

Figure 9:
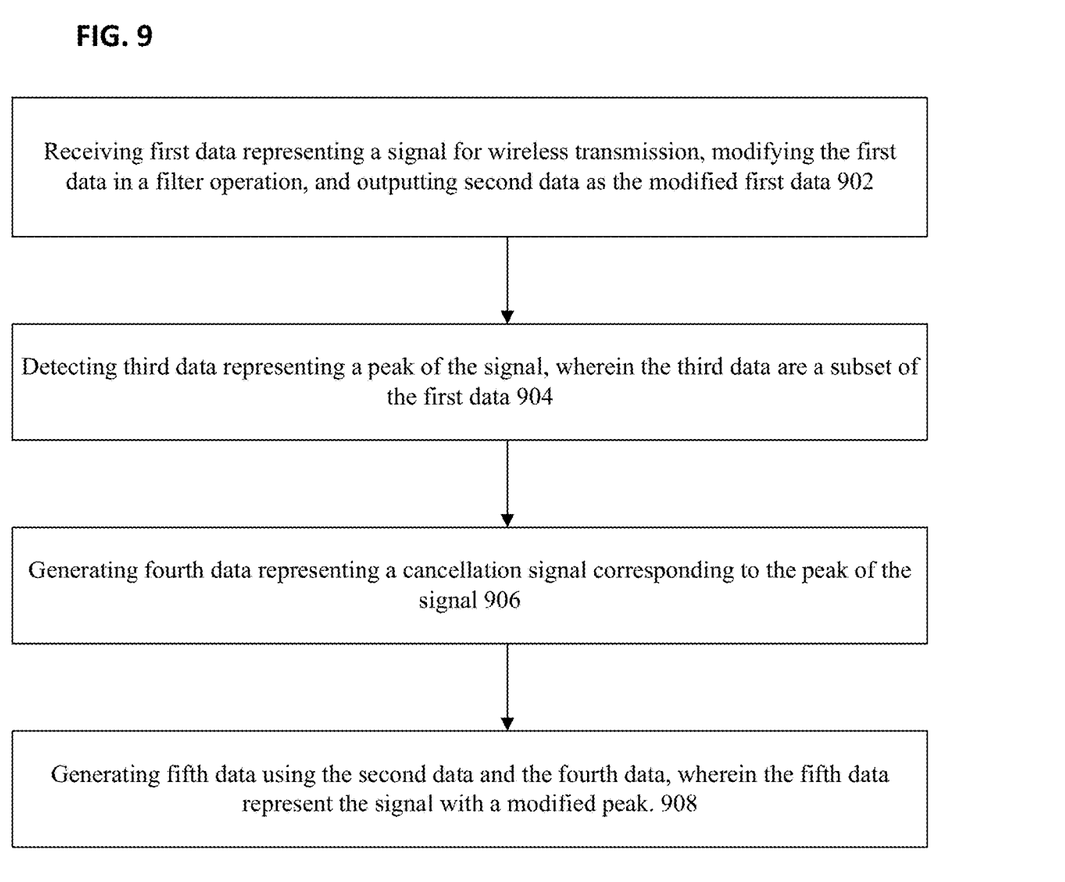
FIG. 9 depicts a method of signal processing.

FIG. 9 depicts a method of signal processing, including: receiving first data representing a signal for wireless transmission, modifying the first data in a filter operation, and outputting second data as the modified first data 902; detecting third data representing a peak of the signal, wherein the third data are a subset of the first data 904; generating fourth data representing a cancellation signal corresponding to the peak of the signal 906; and generating fifth data using the second data and the fourth data, wherein the fifth data represent the signal with a modified peak 908.

It is appreciated that implementations of methods detailed herein are demonstrative in nature, and are thus understood as capable of being implemented in a corresponding device. Likewise, it is appreciated that implementations of devices detailed herein are understood as capable of being implemented as a corresponding method. It is thus understood that a device corresponding to a method detailed herein may include one or more components configured to perform each aspect of the related method.

Although the principles, methods, and devices described herein, and particularly with respect to FIGS. 3-5 are depicted as being performed by individual circuits and/or modules (e.g. a peak detection and pulse scaling module; a cancellation pulse generation module, etc.) one or more processors, whether operating jointly or individually, may perform any of the individual modules disclosed herein. In this manner, one or more processors may be configured to perform one or more actions consistent with a first module as depicted herein, and then subsequently be configured to perform one or more actions consistent with a second module as depicted herein. The depictions include separate modules for demonstrative purposes and should not be understood as requiring physically separate components for each step.

All acronyms defined in the above description additionally hold in all claims included herein.

Further aspects of the disclosure are described below by way of example.

In Example 1, a signal processing device, including: a filter, configured to receive first data representing a signal for wireless transmission, modify the first data in a filter operation, and output second data as the modified first data; a peak detector, configured to detect third data representing a peak of the signal, wherein the third data are a subset of the first data; a signal canceller, configured to receive the third data and to generate fourth data representing a cancellation signal corresponding to the peak of the signal; a peak modifier, configured to receive the second data and the fourth data, and to generate fifth data using the second data and the fourth data, wherein the fifth data represent the signal with a modified peak.

In Example 2, the signal processing device of Example 1, wherein at least one of the peak detector or the signal canceller are configured to perform concurrently or simultaneously with the filter modifier.

In Example 3, the signal processing device of Example 1 or 2, further including a data aligner, configured to receive the second data and the fourth data, and to align the fourth data with a portion of the second data corresponding to the detected peak.

In Example 4, the signal processing device of any one of Examples 1 to 3, wherein the peak modifier is configured to generate the fifth data by subtracting the fourth data from a corresponding portion of the second data.

In Example 5, the signal processing device of any one of Examples 1 to 4, wherein the peak modifier is configured to generate the fifth data by modifying the detected signal peak in the signal.

In Example 6, the signal processing device of any one of Examples 1 to 5, wherein the filter is configured to perform the filtering operation with a first latency; wherein the peak detector and the signal canceller are configured to detect the third data and generate the fourth data with a second latency, and wherein the peak modifier is configured to generate the fifth data after the longer of the first latency or the second latency.

In Example 7, the signal processing device of any one of Examples 1 to 6, wherein performing the filtering operation has a first latency; wherein detecting the third data and generating the fourth data has a second latency, and further including a data aligner configured to resolve a difference between the first latency and the second latency by aligning an output of the cancellation signal circuit and an output of the filter circuit.

In Example 8, the signal processing device of any one of Examples 1 to 7, wherein the filter is configured to perform the filter operation by modifying the first data to remove a frequency from the signal for wireless transmission.

In Example 9, the signal processing device of any one of Examples 1 to 8, wherein the peak detector is configured to detect the third data by comparing a magnitude of the signal with a predetermined threshold.

In Example 10, the signal processing device of Example 9, wherein the detected peak is a portion of the signal with a magnitude greater than the predetermined threshold, and wherein the third data are a portion of the first data corresponding to the portion of the signal having a magnitude greater than the predetermined threshold.

In Example 11, a signal processing device, including: a peak detector, configured to receive first data representing a signal for wireless transmission, and detect second data representing a peak of the signal, wherein the second data are a subset of the first data; a signal processor, configured to receive the first data and the second data, modify the first data in a filter operation, and output third data as the modified first data; and further configured to receive the second data and to generate fourth data representing a cancellation signal corresponding to the peak of the signal; and a peak modifier, configured to receive the third data and the fourth data, and to generate fifth data using the third data and the fourth data, wherein the fifth data represent the signal with a modified peak.

In Example 12, the signal processing device of Example 11, further including a data aligner, configured to receive the third data and the fourth data, and to align the fourth data with a portion of the third data corresponding to the detected peak.

In Example 13, the signal processing device of any one of Examples 11 to 12, wherein the peak modifier is configured to generate the fifth data by subtracting the fourth data from a corresponding portion of the third data.

In Example 14, the signal processing device of any one of Examples 11 to 13, wherein the peak modifier is configured to generate the fifth data by modifying the detected signal peak in the signal.

In Example 15, the signal processing device of any one of Examples 11 to 14, wherein performing the filtering operation has a first latency; wherein generating the fourth data has a second latency, and further including a data aligner configured to resolve a difference between the first latency and the second latency by aligning the fourth data with the second data.

In Example 16, the signal processing device of any one of Examples 11 to 15, wherein the signal processor is configured to perform the filter operation by modifying the first data to remove a frequency from the signal for wireless transmission.

In Example 17, the signal processing device of any one of Examples 11 to 16, wherein the peak detector is configured to detect the second data by comparing a magnitude of the signal with a predetermined threshold.

In Example 18, the signal processing device of Example 17, wherein the detected peak is a portion of the signal with a magnitude greater than the predetermined threshold, and wherein the second data are a portion of the first data corresponding to the portion of the signal having a magnitude greater than the predetermined threshold.

In Example 19, the signal processing device, including: one or more processors, configured to: receive first data representing a signal for wireless transmission, modify the first data in a filter operation, and output second data as the modified first data; detect third data representing a peak of the signal, wherein the third data are a subset of the first data; receive the third data and to generate fourth data representing a cancellation signal corresponding to the peak of the signal; and receive the second data and the fourth data, and to generate fifth data using the second data and the fourth data, wherein the fifth data represent the signal with a modified peak.

In Example 20, the signal processing device of Example 19, wherein at least one of detecting the third data or generating the fourth data is performed concurrently or simultaneously with the filter circuit modifying the first data.

In Example 21, the signal processing device of Example 19 or 20, wherein the one or more processors are further configured to receive the second data and the fourth data, and to align the fourth data with a portion of the second data corresponding to the detected peak.

In Example 22, the signal processing device of any one of Examples 19 to 21, wherein the one or more processors are configured to generate the fifth data by subtracting the fourth data from a corresponding portion of the second data.

In Example 23, the signal processing device of any one of Examples 19 to 22, wherein the one or more processors are configured to generate the fifth data by modifying the detected signal peak in the signal.

In Example 24, the signal processing device of any one of Examples 19 to 23, wherein performing the filtering operation has a first latency; wherein detecting the third data and generating the fourth data has a second latency, and wherein generating the fifth data occurs after the longer of the first latency or the second latency.

In Example 25, the signal processing device of any one of Examples 19 to 24, wherein performing the filtering operation has a first latency; wherein detecting the third data and generating the fourth data has a second latency, and wherein the one or more processors are further configured to resolve a difference between the first latency and the second latency by aligning an output of the cancellation signal circuit and an output of the filter circuit.

In Example 26, the signal processing device of any one of Examples 19 to 25, wherein the one or more processors are further configured to perform the filter operation by modifying the first data to remove a frequency from the signal for wireless transmission.

In Example 27, the signal processing device of any one of Examples 19 to 26, wherein the one or more processors are further configured to detect the third data by comparing a magnitude of the signal with a predetermined threshold.

In Example 28, the signal processing device of Example 27, wherein the detected peak is a portion of the signal with a magnitude greater than the predetermined threshold, and wherein the third data are a portion of the first data corresponding to the portion of the signal having a magnitude greater than the predetermined threshold.

In Example 29, the signal processing device, including: one or more processors, configured to: receive first data representing a signal for wireless transmission, detect second data representing a peak of the signal, wherein the second data are a subset of the first data; receive the first data and the second data, modify the first data in a filter operation, and output third data as the modified first data; and further configured to receive the second data and to generate fourth data representing a cancellation signal corresponding to the peak of the signal; and receive the third data and the fourth data, and to generate fifth data using the third data and the fourth data, wherein the fifth data represent the signal with a modified peak.

In Example 30, the signal processing device of Example 29, wherein the one or more processors are further configured to receive the third data and the fourth data, and to align the fourth data with a portion of the third data corresponding to the detected peak.

In Example 31, the signal processing device of any one of Examples 29 to 30, wherein the one or more processors are further configured to generate the fifth data by subtracting the fourth data from a corresponding portion of the third data.

In Example 32, the signal processing device of any one of Examples 29 to 31, wherein the one or more processors are further configured to generate the fifth data by modifying the detected signal peak in the signal.

In Example 33, the signal processing device of any one of Examples 29 to 32, wherein performing the filtering operation has a first latency; wherein generating the fourth data has a second latency, and wherein the one or more processors are further configured to resolve a difference between the first latency and the second latency by aligning the fourth data with the second data.

In Example 34, the signal processing device of any one of Examples 29 to 33, wherein the one or more processors are configured to perform the filter operation by modifying the first data to remove a frequency from the signal for wireless transmission.

In Example 35, the signal processing device of any one of Examples 29 to 34, wherein the one or more processors are configured to detect the second data by comparing a magnitude of the signal with a predetermined threshold.

In Example 36, the signal processing device of Example 35, wherein the detected peak is a portion of the signal with a magnitude greater than the predetermined threshold, and wherein the second data are a portion of the first data corresponding to the portion of the signal having a magnitude greater than the predetermined threshold.

In Example 37, a method of signal processing, including: receiving first data representing a signal for wireless transmission, modifying the first data in a filter operation, and outputting second data as the modified first data; detecting third data representing a peak of the signal, wherein the third data are a subset of the first data; generating fourth data representing a cancellation signal corresponding to the peak of the signal; and generating fifth data using the second data and the fourth data, wherein the fifth data represent the signal with a modified peak.

In Example 38, the method of signal processing of Example 37, wherein at least one of the detecting the third data or the generating the fourth data occurs concurrently or simultaneously with modifying the first data.

In Example 39, the method of signal processing of Example 37 or 38, further including aligning the fourth data with a portion of the second data corresponding to the detected peak.

In Example 40, the method of signal processing of any one of Examples 37 to 39, wherein generating the fifth data includes subtracting the fourth data from a corresponding portion of the second data.

In Example 41, the method of signal processing of any one of Examples 37 to 40, wherein generating the fifth data includes modifying the detected signal peak in the signal.

In Example 42, the method of signal processing of any one of Examples 37 to 41, wherein the filtering operation is performed with a first latency; wherein detecting the third data and generating the fourth data are performed with a second latency, and wherein the fifth data is generated after the longer of the first latency or the second latency.

In Example 43, the method of signal processing of any one of Examples 37 to 42, wherein performing the filtering operation has a first latency; wherein detecting the third data and generating the fourth data has a second latency, and further including resolving a difference between the first latency and the second latency by aligning an output of the cancellation signal circuit and an output of the filter circuit.

In Example 44, the method of signal processing of any one of Examples 37 to 43, wherein performing the filter operation includes modifying the first data to remove a frequency from the signal for wireless transmission.

In Example 45, the method of signal processing of any one of Examples 37 to 44, wherein detecting the third data includes comparing a magnitude of the signal with a predetermined threshold.

In Example 46, the method of signal processing of Example 45, wherein the detected peak is a portion of the signal with a magnitude greater than the predetermined threshold, and wherein the third data are a portion of the first data corresponding to the portion of the signal having a magnitude greater than the predetermined threshold.

In Example 47, a method of signal processing, including: receiving first data representing a signal for wireless transmission, and detecting second data representing a peak of the signal, wherein the second data are a subset of the first data; modifying the first data in a filter operation, and outputting third data as the modified first data; generating from the second data fourth data representing a cancellation signal corresponding to the peak of the signal; and generating fifth data using the third data and the fourth data, wherein the fifth data represent the signal with a modified peak.

In Example 48, the method of signal processing of Example 47, further including aligning the fourth data with a portion of the third data corresponding to the detected peak.

In Example 49, the method of signal processing of any one of Examples 47 to 48, wherein generating the fifth data includes subtracting the fourth data from a corresponding portion of the third data.

In Example 50, the method of signal processing of any one of Examples 47 to 49, wherein generating the fifth data includes modifying the detected signal peak in the signal.

In Example 51, the method of signal processing of any one of Examples 47 to 50, wherein performing the filtering operation has a first latency; wherein generating the fourth data has a second latency, and further including resolving a difference between the first latency and the second latency by aligning the fourth data with the second data.

In Example 52, the method of signal processing of any one of Examples 47 to 51, wherein performing the filter operation includes modifying the first data to remove a frequency from the signal for wireless transmission.

In Example 53, the method of signal processing of any one of Examples 47 to 52, wherein detecting the second data includes comparing a magnitude of the signal with a predetermined threshold.

In Example 54, the method of signal processing of Example 53, wherein the detected peak is a portion of the signal with a magnitude greater than the predetermined threshold, and wherein the second data are a portion of the first data corresponding to the portion of the signal having a magnitude greater than the predetermined threshold.

In Example 55, a non-transitory computer readable medium including instructions which, if executed, cause one or more processors to perform any of Examples 37 to 54.

In Example 56, a signal processing device, including: a means for receiving first data representing a signal for wireless transmission, modifying the first data in a filter operation, and outputting second data as the modified first data; a means for detecting third data representing a peak of the signal, wherein the third data are a subset of the first data; a means for receiving the third data and generating fourth data representing a cancellation signal corresponding to the peak of the signal; a means for receiving the second data and the fourth data, and generating fifth data using the second data and the fourth data, wherein the fifth data represent the signal with a modified peak.

In Example 57, the signal processing device of Example 56, wherein at least one of a means for detecting third data representing a peak of the signal or the means for receiving the third data and generating fourth data representing a cancellation signal corresponding to the peak of the signal are configured to perform concurrently or simultaneously with the filter modifier.

In Example 58, the signal processing device of Example 56 or 57, further including a means for receiving the second data and the fourth data, and aligning the fourth data with a portion of the second data corresponding to the detected peak.

In Example 59, the signal processing device of any one of Examples 56 to 58, including generating the fifth data by subtracting the fourth data from a corresponding portion of the second data.

In Example 60, the signal processing device of any one of Examples 56 to 59, including generating the fifth data by modifying the detected signal peak in the signal.

In Example 61, the signal processing device of any one of Examples 56 to 60, wherein the filtering operation is performed with a first latency; wherein detecting the third data and generating the fourth data is performed with a second latency, and wherein generating the fifth data is performed after the longer of the first latency or the second latency.

In Example 62, the signal processing device of any one of Examples 56 to 61, wherein performing the filtering operation has a first latency; wherein detecting the third data and generating the fourth data has a second latency, and further including resolving a difference between the first latency and the second latency by aligning an output of the cancellation signal circuit and an output of the filter circuit.

In Example 63, the signal processing device of any one of Examples 56 to 62, further including modifying the first data to remove a frequency from the signal for wireless transmission.

In Example 64, the signal processing device of any one of Examples 56 to 63, wherein detecting the third data is performed by comparing a magnitude of the signal with a predetermined threshold.

In Example 65, the signal processing device of Example 64, wherein the detected peak is a portion of the signal with a magnitude greater than the predetermined threshold, and wherein the third data are a portion of the first data corresponding to the portion of the signal having a magnitude greater than the predetermined threshold.

In Example 66, a signal processing device, including: a means for receiving first data representing a signal for wireless transmission, and detecting second data representing a peak of the signal, wherein the second data are a subset of the first data; a means for receiving the first data and the second data, modifying the first data in a filter operation, and outputting third data as the modified first data; and further for receiving the second data and generating fourth data representing a cancellation signal corresponding to the peak of the signal; and a means for receiving the third data and the fourth data, and generating fifth data using the third data and the fourth data, wherein the fifth data represent the signal with a modified peak.

In Example 67, the signal processing device of Example 66, further including a means for receiving the third data and the fourth data, and aligning the fourth data with a portion of the third data corresponding to the detected peak.

In Example 68, the signal processing device of any one of Examples 66 to 67, wherein generating the fifth data includes subtracting the fourth data from a corresponding portion of the third data.

In Example 69, the signal processing device of any one of Examples 66 to 68, wherein generating the fifth data includes modifying the detected signal peak in the signal.

In Example 70, the signal processing device of any one of Examples 66 to 69, wherein performing the filtering operation has a first latency; wherein generating the fourth data has a second latency, and further including a means for resolving a difference between the first latency and the second latency by aligning the fourth data with the second data.

In Example 71, the signal processing device of any one of Examples 66 to 70, wherein performing the filter operation includes modifying the first data to remove a frequency from the signal for wireless transmission.

In Example 72, the signal processing device of any one of Examples 66 to 71, wherein detecting the second data includes comparing a magnitude of the signal with a predetermined threshold.

In Example 73, the signal processing device of Example 72, wherein the detected peak is a portion of the signal with a magnitude greater than the predetermined threshold, and wherein the second data are a portion of the first data corresponding to the portion of the signal having a magnitude greater than the predetermined threshold.

What is claimed is:

1. A signal processing device, comprising:
   a filter, configured to receive first data representing a signal for wireless transmission, modify the first data in a filter operation, and output second data as the modified first data;
   a peak detector, configured to detect third data representing a peak of the signal, wherein the third data are a subset of the first data;
   a signal canceller, configured to receive the third data and to generate fourth data representing a cancellation signal corresponding to the peak of the signal; and
   a peak modifier, configured to receive the second data and the fourth data, and to generate fifth data using the second data and the fourth data, wherein the fifth data represent the signal with a modified peak;
   wherein at least one of the peak detector or the signal canceller are configured to operate concurrently or simultaneously with the filter;
   wherein the at least one of the peak detector or the signal canceller being configured to operate concurrently or simultaneously with the filter comprises at least one of the peak detector or the signal canceller processing the first data concurrently or simultaneously with a processing of the first data by the filter.

2. The signal processing device of claim 1, further comprising a data aligner, configured to receive the second data and the fourth data, and to align the fourth data with a portion of the second data corresponding to the detected peak.

3. The signal processing device of claim 1, wherein the peak modifier is configured to generate the fifth data by subtracting the fourth data from a corresponding portion of the second data.

4. The signal processing device of claim 1, wherein the filter is configured to perform the filtering operation with a first latency; wherein the peak detector and the signal canceller are configured to detect the third data and generate the fourth data with a second latency, and wherein the peak modifier is configured to generate the fifth data after the longer of the first latency or the second latency.

5. The signal processing device of claim 1, wherein performing the filtering operation has a first latency; wherein detecting the third data and generating the fourth data has a second latency, and further comprising a data aligner configured to resolve a difference between the first latency and the second latency by aligning an output of the cancellation signal circuit and an output of the filter circuit.

6. The signal processing device of claim 1, wherein the peak detector is configured to detect the third data by comparing a magnitude of the signal with a predetermined threshold; and wherein the detected peak is a portion of the signal with a magnitude greater than the predetermined threshold, and wherein the third data are a portion of the first data corresponding to the portion of the signal having a magnitude greater than the predetermined threshold.

7. A method of signal processing, comprising:
receiving first data representing a signal for wireless transmission, modifying the first data in a filter operation, and outputting second data as the modified first data;
detecting third data representing a peak of the signal, wherein the third data are a subset of the first data;
generating fourth data representing a cancellation signal corresponding to the peak of the signal; and
generating fifth data using the second data and the fourth data, wherein the fifth data represent the signal with a modified peak;
wherein at least one of the detecting the third data or the generating the fourth data occurs concurrently or simultaneously with the modifying the first data in the filter operation.

8. The method of signal processing of claim 7, further comprising aligning the fourth data with a portion of the second data corresponding to the detected peak.

9. The method of signal processing of claim 7, wherein generating the fifth data comprises subtracting the fourth data from a corresponding portion of the second data.

10. The method of claim 7, wherein the at least one of the detecting the third data or the generating the fourth data occurring concurrently or simultaneously with the modifying the first data comprises at least one of the detecting the third data from the first data or the generating the fourth data from the first data occurring concurrently or simultaneously with the modifying of the first data.

* * * * *